(12) United States Patent
Hakamada

(10) Patent No.: US 7,009,612 B2
(45) Date of Patent: Mar. 7, 2006

(54) APPARATUS AND METHOD FOR FONT GENERATION, AND COMPUTER-READABLE STORAGE MEDIUM RECORDING PROGRAM FOR THE SAME

(75) Inventor: Junichi Hakamada, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 47 days.

(21) Appl. No.: 10/668,264

(22) Filed: Sep. 24, 2003

(65) Prior Publication Data

US 2004/0140977 A1 Jul. 22, 2004

(30) Foreign Application Priority Data

Sep. 25, 2002 (JP) ............................ P2002-279612

(51) Int. Cl.
*G06T 11/00* (2006.01)
(52) U.S. Cl. ...................... 345/471; 345/467; 345/978
(58) Field of Classification Search ..... 345/467–472.3, 345/947–948
See application file for complete search history.

(56) References Cited

U.S. PATENT DOCUMENTS 5,062,047 A * 10/1991 Tanaka et al. .................. 704/3
6,621,941 B1 * 9/2003 Syeda-Mahmood et al. ..... 382/306

FOREIGN PATENT DOCUMENTS

AU 9952594 * 4/2000
JP 10-333663 12/1998

OTHER PUBLICATIONS

Sims, Karl. "Artificial evolution for computer graphics." Jul. 1991 ACM SIGGRAPH Computer Graphics , Proceedings of the 18th annual conference on Computer graphics and interactive techniques, vol. 25 Issue 4 □□.*

* cited by examiner

*Primary Examiner*—Michael Razavi
*Assistant Examiner*—Eric Woods
(74) *Attorney, Agent, or Firm*—Nath & Associates PLLC; Gregory B. Kang; Stanley N. Protigal

(57) ABSTRACT

A font generation apparatus includes: a basic font storage section storing a font character of a basic font for generating a font character; a feature parameter storage section storing a feature parameter expressing a feature of the font character; a genetic algorithm processing section generating plural new feature parameters by performing genetic algorithm processing on the feature parameter; a font generation section generating new font characters by deforming the font character of the basic font based on the plural generated feature parameters; and a display unit displaying the generated new font characters. The genetic algorithm processing section determines the feature parameter according to the preferences of a user based on a font character selected by the user from among the new font characters displayed on the display unit. The font generation section creates a font based on the determined feature parameter according to the preferences of the user.

12 Claims, 8 Drawing Sheets

FIG.3

| RADICALS OF FONT CHARACTER | | PARAMETERS (SYMBOL) |
|---|---|---|
| STROKE | LENGTH | HORIZONTAL STROKE (a1), VERTICAL STROKE (b1), LEFT PULLOUT STROKE (c1), RIGHT PULLOUT STROKE (d1), DOT STROKE (e1), FLICK STROKE (f1) |
| | ROUNDNESS | HORIZONTAL STROKE (a2), VERTICAL STROKE (b2), LEFT PULLOUT STROKE (c2), RIGHT PULLOUT STROKE (d2), DOT STROKE (e2), FLICK STROKE (f2) |
| | UNDULATION | HORIZONTAL STROKE (a3), VERTICAL STROKE (b3) |
| | ANGLE | LEFT PULLOUT STROKE (c3), RIGHT PULLOUT STROKE (d3), DOT STROKE (e3), FLICK STROKE (f3) |
| | WEIGHT | WEIGHT (j1), BEGINNING OF STROKE (j2), MIDDLE OF STROKE (j3), FINISHING OF STROKE (j4) |
| | CORNER | ROUNDNESS (g1) |
| DEFORMATION OF OUTSIDE SHAPE OF FONT CHARACTER | | UPWARD (DOWNWARD) STROKE TO RIGHT (h1) |
| | | LEANING STROKE TO LEFT (RIGHT) (i1) |

FIG.4

| GENE | | PARAMETER VALUES | | | | |
|---|---|---|---|---|---|---|
| SYM-BOL | PARAMETER | 1 | 2 | 3 (STANDARD) | 4 | 5 |
| a1 | LENGTH OF HORIZONTAL STROKE | | | | | |
| a2 | ROUNDNESS OF HORIZONTAL STROKE | | | | | |
| a3 | UNDULATION OF HORIZONTAL STROKE | | | | | |
| b1 | LENGTH OF VERTICAL STROKE | | | | | |
| b2 | ROUNDNESS OF VERTICAL STROKE | | | | | |
| b3 | UNDULATION OF VERTICAL STROKE | | | | | |
| c1 | LENGTH OF LEFT PULLOUT STROKE | | | | | |
| c2 | ROUNDNESS OF LEFT PULLOUT STROKE | | | | | |
| c3 | ANGLE OF LEFT PULLOUT STROKE | | | | | |
| d1 | LENGTH OF RIGHT PULLOUT STROKE | | | | | |
| d2 | ROUNDNESS OF RIGHT PULLOUT STROKE | | | | | |
| d3 | ANGLE OF RIGHT PULLOUT STROKE | | | | | |
| e1 | LENGTH OF DOT STROKE | | | | | |

FIG.5

| GENE | | PARAMETER VALUES | | | | |
|---|---|---|---|---|---|---|
| SYM-BOL | PARAMETER | 1 | 2 | 3 (STANDARD) | 4 | 5 |
| e2 | ROUNDNESS OF DOT STROKE | | | | | |
| e3 | ANGLE OF DOT STROKE | | | | | |
| f1 | LENGTH OF FLICK STROKE | | | | | |
| f2 | ROUNDNESS OF FLICK STROKE | | | | | |
| f3 | ANGLE OF FLICK STROKE | | | | | |
| g1 | ROUNDNESS OF CORNER | | | | | |
| h1 | UPWARD (DOWNWARD) STROKE TO RIGHT | | | | | |
| i1 | LEANING STROKE TO LEFT | | | | | |
| j1 | WEIGHT OF STROKE | | | | | |
| j2 | WEIGHT OF BEGINNING OF STROKE | | | | | |
| j3 | WEIGHT OF MIDDLE OF STROKE | | | | | |
| j4 | WEIGHT OF FINISHING OF STROKE | | | | | |

FIG.6

| NO. | CHROMOSOME | FONT CHARACTER |
|---|---|---|
| | a a a b b b c c c d d d e e e f f f g h i j j j j<br>1 2 3 1 2 3 1 2 3 1 2 3 1 2 3 1 2 3 1 1 1 1 2 3 4 | |
| 1 | 3 4 3 3 4 3 3 4 3 3 4 3 3 4 3 3 4 3 4 3 3 3 1 1 1 | |
| 2 | 3 3 3 3 3 3 4 3 3 4 3 3 3 3 3 3 3 3 3 3 2 3 3 1 | |
| 3 | 3 3 3 3 3 3 3 3 3 3 3 3 3 3 3 3 3 3 2 2 3 1 1 3 1 | |
| 4 | 5 3 3 2 3 3 3 3 4 3 3 4 3 3 1 3 3 1 3 3 3 5 1 1 1 | |
| 5 | 3 3 3 3 2 3 1 4 3 1 2 3 1 3 5 3 3 3 3 3 3 3 4 1 4 | |

FIG.7A

| NO. | CHROMOSOME<br>a a a b b b c c c d d d e e e f f f g h i j j j j<br>1 2 3 1 2 3 1 2 3 1 2 3 1 2 3 1 2 3 1 1 1 2 3 4 | FONT CHARACTER |
|---|---|---|
| 1 | 3 4 3 3 4 3 3 4 3 3 4 3 3 4 3 3 4 3 4 3 3 3 1 1 1 | 永 |
| 4 | 5 3 3 2 3 3 3 4 3 3 4 3 3 1 3 3 1 3 3 3 5 1 1 1 | 永 |

FIG.7B

| NO. | CHROMOSOME<br>a a a b b b c c c d d d e e e f f f g h i j j j j<br>1 2 3 1 2 3 1 2 3 1 2 3 1 2 3 1 2 3 1 1 1 2 3 4 | FONT CHARACTER |
|---|---|---|
| 6 | 3 4 3 3 4 3 3 4 3 3 4 3 3 4 3 3 4 3 4 3 3 3 1 1 1<br>5 3 3 2 3 3 3 4 3 3 4 3 3 1 3 3 1 3 3 3 5 1 1 1<br>↓CROSSOVER<br>3 4 3 3 4 3 3 3 4 3 3 4 3 3 1 3 3 1 3 3 3 5 1 1 1 | 永 |
| 7 | 3 4 3 3 4 3 3 4 3 3 4 3 3 4 3 3 4 3 4 3 3 3 1 1 1<br>5 3 3 2 3 3 3 4 3 3 4 3 3 1 3 3 1 3 3 3 5 1 1 1<br>↓CROSSOVER<br>3 4 3 3 4 3 3 3 4 3 3 4 3 3 1 3 3 1 4 3 3 3 1 1 1 | 永 |
| 8 | 3 4 3 3 4 3 3 4 3 3 4 3 3 4 3 3 4 3 4 3 3 3 1 1 1<br>5 3 3 2 3 3 3 4 3 3 4 3 3 1 3 3 1 3 3 3 5 1 1 1<br>↓CROSSOVER<br>5 5 3 2 4 3 3 4 4 3 3 4 3 3 1 3 3 1 3 3 3 5 1 1 1 | 永 |
| 9 | 3 4 3 3 4 3 3 4 3 3 4 3 3 4 3 3 4 3 4 3 3 3 1 1 1<br>5 3 3 2 3 3 3 4 3 3 4 3 3 1 3 3 1 3 3 3 5 1 1 1<br>↓CROSSOVER<br>5 4 3 3 4 3 3 4 3 3 4 4 3 3 1 3 3 1 3 3 3 5 1 1 1<br>MUTATION↓<br>5 4 3 3 4 3 3 4 3 3 4 4 3 3 1 3 3 1 3 2 5 1 5 1 1 | 永 |
| 10 | 3 4 3 3 4 3 3 4 3 3 4 3 3 4 3 3 4 3 4 3 3 3 1 1 1<br>5 3 3 2 3 3 3 4 3 3 4 3 3 1 3 3 1 3 3 3 5 1 1 1<br>↓CROSSOVER<br>3 4 3 3 4 3 3 3 4 3 3 4 3 4 3 3 4 3 4 3 3 3 1 1 1<br>↓MUTATION<br>3 2 2 5 2 3 3 3 4 3 3 4 3 4 3 3 4 3 4 3 3 3 1 1 1 | 永 |

WHERE a1=3, a2=3, a3=3

WHERE a1=3, a2=4, a3=3

WHERE a1=2, a2=2, a3=3

WHERE a1=3, a2=3, a3=4

WHERE a1=4, a2=4, a3=4

APPARATUS AND METHOD FOR FONT GENERATION, AND COMPUTER-READABLE STORAGE MEDIUM RECORDING PROGRAM FOR THE SAME

BACKGROUND OF THE INVENTION

1. Field of the Invention

The present invention relates to technology for generating a digital font (herein below, abbreviated as "font") used for an information-processing apparatus, a printer, or the like. In particular, the present invention pertains to an apparatus, a method, and a computer-readable storage medium recording a program for generating fonts according to the preferences of a user or near a user's handwriting.

2. Description of the Related Art

There are various typeface such as "Mincho" style (typical Japanese typeface), Gothic style, brush style, "Kyokasho" (meaning "textbook" in English) style, handwritten character style, or the like, among the typefaces of the fonts used by printers or an information-processing apparatus such as a personal computer, a Personal Digital Assistant (PDA), or the like. These fonts are provided by a computer maker, a font maker, or the like.

In this specification, the "font" means a character set created with the same typeface, and each character marking each division of the font, or equivalently, each character constituting the font is defined as a "font character".

Although such a font typeface is beautifully designed in appearance, conversely, it may give a reader of a printed document an impression of uniformity and a lack of individuality. Moreover, there are also many users who feel resistance to using these fonts for personal documents, such as a letter.

Against such a background, the application software has been provided capable of creating a new typeface and generating a user's individual fonts by processing a positioning arrangement, a deformation, or the like to radicals constituting "Kanji" characters (Japanese characters), such as "Hen" (i.e., a left-hand radical of the "Kanji"), "Tsukuri" (i.e., a right-hand radical of the "Kanji"), or the like. However, since such application software supported only the very limited typeface fonts, such as the "Mincho" style or the Gothic style, it was very difficult for the user to create a user's individual font.

Further, in the case of the Japanese language, since many characters are needed as compared with European languages, the number of the "Kanji" characters used in the Japanese language reaches about 3,000 characters in Japanese Industrial Standards (JIS) level-1 kanji characters, and also reaches about 7,000 characters included JIS level-2 kanji characters. Therefore, enormous efforts are needed in order to create the user's individual font using the application software.

Moreover, an application software for creating the fonts using handwritten characters inputted by means of a picture reading apparatus such as an image scanner is also provided. However, through the use of such the application software, since a user has to write all the necessary characters by hand, enormous efforts are needed in order to create the user's individual font.

In order to solve such a problem, an apparatus for font generation based on the handwritten characters of users by recognizing the handwritten characters, comparing with a basic font applicable to the recognized characters in order to extract the features of a user's handwritten characters, memorizing the extracted features, and changing the basic font based on the features is proposed. (See the Japanese Patent Laid Open Publication (Kokai) No. H10-333663.)

In the font generation apparatus disclosed in the above-mentioned reference, even if a user's font of the handwritten character style can be created, the font which a user desires cannot necessarily be created. For example, the user whose handwriting is poor may desire a font of a more beautiful typeface, and a font according to the user's handwritten character style is not necessarily the typeface which a user desires.

Further, generally it is difficult to express favorite fonts by a conversation or writing, etc. Furthermore, even when creating a font according to the preferences of a user by modifying the already-existing fonts, it is also difficult to explain which parts or how to modify the font characters of the already-existing fonts in order to approach the preferences of the user. Therefore, the user has to repeat trial and error until a font according to the preferences of user are created.

SUMMARY OF THE INVENTION

An apparatus for font generation according to an embodiment of the present invention includes: (a) a basic font storage section storing a font character of a basic font for generating a font character; (b) a feature parameter storage section storing a feature parameter expressing a feature of the font character; (c) a genetic algorithm processing section configured to generate plural new feature parameters by performing genetic algorithm processing on the feature parameter; (d) a font generation section configured to generate new font characters by deforming the font character of the basic font based on the plural feature parameters generated in the genetic algorithm processing section; and (e) a display unit displaying the new font characters generated in the font generation section. The genetic algorithm processing section determines the feature parameter according to the preferences of a user based on a font character selected by the user from among the new font characters displayed on the display unit, and the font generation section creates a font based on the feature parameter according to the preferences of the user determined by the genetic algorithm processing section.

Further, a computer readable storage medium recording a program for font generation according to an embodiment of the present invention, the program executing in a font generation apparatus, the program includes: (a) generating plural new feature parameters by performing genetic algorithm processing on a feature parameter expressing the feature of a font character; (b) generating new font characters by deforming a font character of a basic font for generating a font character based on the plural generated feature parameters; (c) displaying the new generated font characters on a display unit; (d) determining the feature parameter according to the preferences of a user based on a font character selected by the user from among the new font characters displayed on the display unit; and (e) creating a font based on the determined feature parameter according to the preferences of the user.

Furthermore, a method for font generation in an apparatus for font generation according to an embodiment of the present invention, the method includes: (a) generating plural new feature parameters by performing genetic algorithm processing on a feature parameter expressing the feature of a font character; (b) generating new font characters by deforming a font character of a basic font for generating a font character based on the plural generated feature parameters; (c) displaying the new generated font characters on a display unit; (d) determining the feature parameter according to the preferences of a user based on a font character selected by the user from among the new font characters displayed on the display unit; and (e) creating a font based on the determined feature parameter according to the preferences of the user.

BRIEF DESCRIPTION OF THE DRAWINGS

FIG. 3 is an illustration showing an example of radicals and parameters of a font character in the present embodiment.

FIGS. 4 and 5 are illustrations showing an example of the font character in the case of modifying values of the parameters shown in FIG. 3.

FIG. 6 is an illustration showing the relation between the chromosome and the feature parameter of the font character in the present embodiment.

FIGS. 7A and 7B are illustrations for explaining an example of processing of the genetic algorithm in the present embodiment. FIG. 7A shows the example of the chromosomes of the parents, and FIG. 7B shows the example of the chromosome of children inherited a part of the chromosomes of the parents and generated.

FIGS. 8A to 8E show the example of how the shape of the horizontal stroke is changed in the case of modifying the values of the parameters a1 to a3.

DETAILED DESCRIPTION

Figure 1:
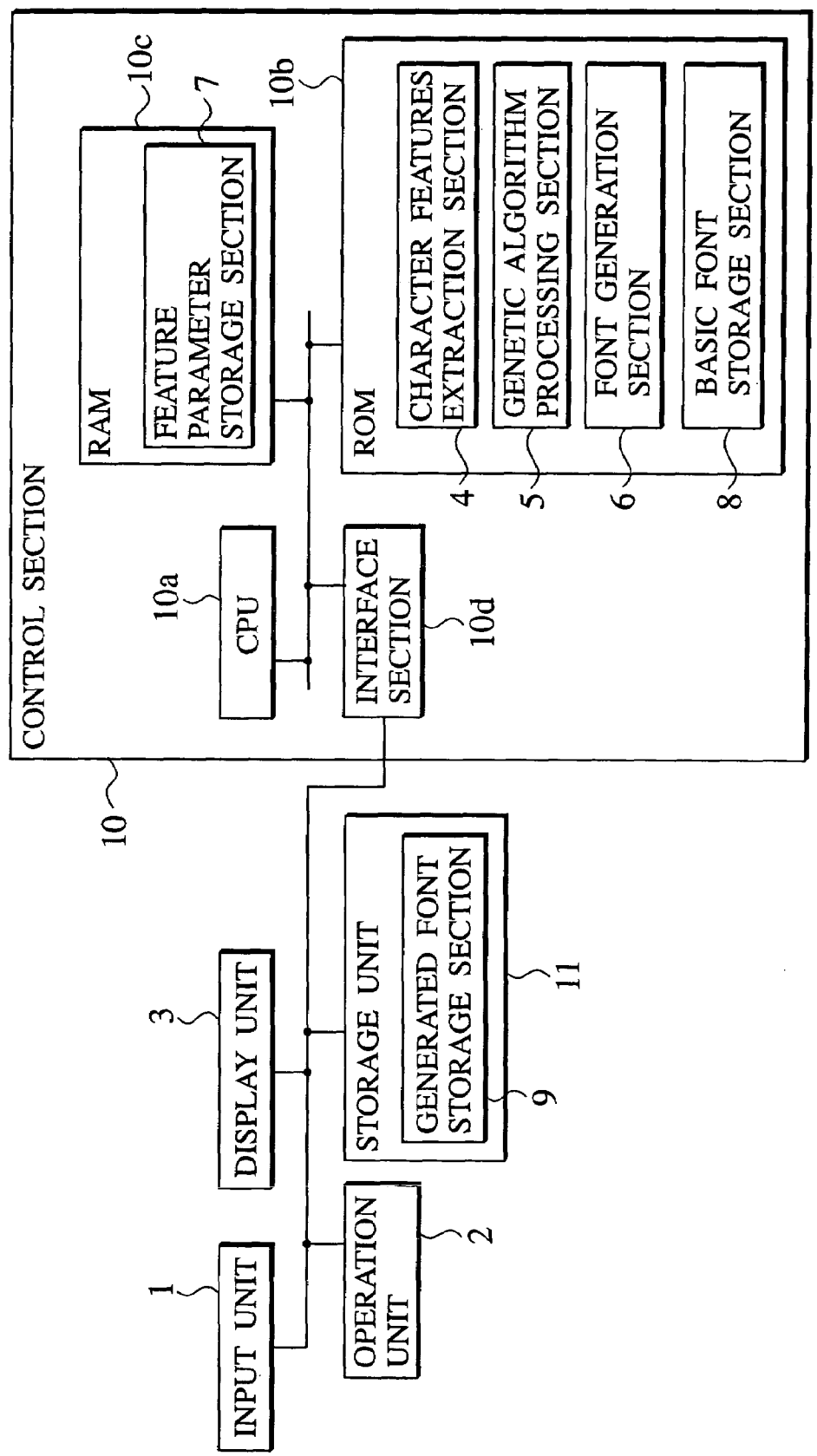
FIG. 1 is a block diagram showing an example of a schematic structure of a font generation apparatus according to an embodiment of the present invention.

The present embodiment aims to disclose an apparatus, a method, and a computer-readable storage medium recording a program for generating fonts according to the preferences of a user easily.

An apparatus for font generation according to the present embodiment includes: (a) a basic font storage section storing a font character of a basic font for generating a font character; (b) a feature parameter storage section storing a feature parameter expressing a feature of the font character; (c) a genetic algorithm processing section configured to generate plural new feature parameters by performing genetic algorithm processing on the feature parameter; (d) a font generation section configured to generate new font characters by deforming the font character of the basic font based on the plural feature parameters generated in the genetic algorithm processing section; and (e) a display unit displaying the new font characters generated in the font generation section. The genetic algorithm processing section determines the feature parameter according to the preferences of a user based on a font character selected by the user from among the new font characters displayed on the display unit, and the font generation section creates a font based on the feature parameter according to the preferences of the user determined by the genetic algorithm processing section.

Further, a computer readable storage medium recording a program for font generation according to the present embodiment, the program executing in a font generation apparatus, the program includes: (a) generating plural new feature parameters by performing genetic algorithm processing on a feature parameter expressing the feature of a font character; (b) generating new font characters by deforming a font character of a basic font for generating a font character based on the plural generated feature parameters; (c) displaying the new generated font characters on a display unit; (d) determining the feature parameter according to the preferences of a user based on a font character selected by the user from among the new font characters displayed on the display unit; and (e) creating a font based on the determined feature parameter according to the preferences of the user.

According to the above composition, by only repeating the selection a favorite font character out of the plural displayed font characters, the user can create a font according to the user's own preferences. Thus, the user can create the font intuitively, without effort, and without concern for details, such as the structure of the font character.

Furthermore, the above-mentioned font generation apparatus can further include: (f) an input unit scanning a character handwritten by the user; and (g) a character features extraction section configured to recognize a character from character data scanned by the input unit, to compare the recognized character and the font character of the basic font, and to extract a feature of the handwritten character as the feature parameter. According to the above composition, the user can easily create a font according to the user's own preferences based on the feature parameters of the user's handwritten characters.

Various embodiments of the present invention will be described herein below with reference to the accompanying FIGS. 1 through 8E. It is to be noted that the same or similar reference numerals are applied to the same or similar parts and elements throughout the drawings, and the description of the same or similar parts and elements will be omitted or simplified.

[Components of Font Generation Apparatus]

First, with reference to FIG. 1, a composition of a font generation apparatus according to the present embodiment is explained.

The font generation apparatus according to the present embodiment includes an input unit 1, an operation unit 2, a display unit 3, a control section 10, and a storage unit 11.

The input unit 1 is an input device, such as an image scanner to read character pictures of handwritten characters which the user handwrote on paper, a tablet to input data of stroke information at the time of the pen input operation by the user, or the like.

The operation unit 2 is an input device, such as a keyboard, a mouse, or the like, for the user to choose a favorite font characters from among the font characters displayed on the display unit 3.

The display unit 3 is a display device for displaying the font characters generated by a processing operation described later, such as a Cathode Ray Tube (CRT), a Liquid Crystal Display (LCD), or the like.

The control section 10 includes a Central Processing Unit (CPU) 10a, a Read Only Memory (ROM) 10b, a Random Access Memory (RAM) 10c, an interface section 10d, etc. The CPU 10a controls operation of the font generation apparatus according to the various programs stored in the ROM 10b. The ROM 10b stores various programs for realizing the function of the font generation apparatus, for example, an application program of a character features extraction section 4, a genetic algorithm processing section 5, and a font generation section 6, and stores the various data, for example, data required for execution of the program of a basic font storage section 8. The RAM 10c is a work area for storing temporarily the program or data (for example, data of a feature parameter storage section 7) relating to various operations which the CPU 10a performs. The interface section 10d performs processing for the CPU 10a transmitting/receiving a control signal or data to/from the input unit 1, the operation unit 2, the display unit 3, and the storage unit 11, according to the various programs.

The storage unit 11 is storage device for storing the created font characters.

The character features extraction section 4 judges which character the handwritten character is corresponds to from the font characters of a basic font stored in the basic font storage section 8, based on the character picture and position information of the handwritten characters sent from the input unit 1.

Furthermore, the character features extraction section 4 extracts the character picture and stroke information from the handwritten character, compares the character picture and stroke information with the font character of the basic font stored in the basic font storage section 8 corresponding to a character code (for example, Shift JIS code), extracts the feature of the handwriting character, and sends the extracted feature to the feature parameter storage section 7 as a feature parameter (described later in detail).

Here, the "basic font" means a skeleton font expressed by the medial axis of the line segment constituting a character.

The genetic algorithm processing section 5 performs genetic algorithm processing called "Crossover", "Mutation", or the like, for two of the chromosomes selected (by "Selection") from plural chromosomes (described later in detail) stored in the feature parameter storage section 7, and generates plural new chromosomes. And the genetic algorithm processing section 5 sends the newly generated plural chromosomes to the feature parameter storage section 7. "Selection" consists of selecting an excellent chromosome out of collection, "Crossover" is exchanging a part of chromosome (gene) between two selected chromosomes, and "Mutation" is compulsorily changing a part of chromosome (gene) according to a preset probability.

The font generation section 6 processes deformation of the font character of the basic font stored in the basic font storage section 8 based on the chromosome generated in the genetic algorithm processing section 5, and displays the generated font character on the display unit 3 or sends the generated font character with the corresponding character code to the generated font storage section 9.

The feature parameter storage section 7 stores the feature parameters of the handwritten characters of the user sent from the character features extraction section 4 and the chromosome sent from the genetic algorithm processing section 5.

The basic font storage section 8 stores information which indicates radicals, such as "Hen", "Tsukuri", or the like, of the font character and information which indicates the size and the arrangement position of the radicals, as basic font information with a corresponding the character code for each font character.

The generated font storage section 9 stores the font characters generated in the font generation section 6, with a corresponding character code The genetic algorithm processing section 5 determines a feature parameter according to the preferences of the user based on the font characters confirmed by the user.

[Processing Operation of Font Generation Apparatus]

Hereafter, with reference to the flow chart shown in FIG. 2, the processing operation of the font generation apparatus will be explained.

In Step S1, the control section 10 controls the display unit 3 to display a message (confirmation message) which inquires whether or not to generate font characters based on the user own handwritten characters, and allows the user to select whether or not to generate font characters based on handwritten characters input via the operation unit 2.

In Step S2, the control section 10 distinguishes whether or not the user has selected to generate font characters based on the handwritten characters. As a result of the discrimination, if the user has selected not to generate font characters based on handwritten characters, as a processing of Step S3, the genetic algorithm processing section 5 determines random genes which constitute chromosomes (described later in detail), and generates plural chromosomes. That is, the genetic algorithm processing section 5 generates parameter values of the feature parameters of font characters at random, and generates the plural feature parameters.

On the other hand, if as a result of the distinction in Step S2, the user selects the generation of the font characters based on handwritten characters, as a processing of Step S4, the character features extraction section 4 controls the display unit 3 to display a predetermined character string (test pattern) for extracting the feature parameters of the handwritten characters, and allows the user to input handwritten characters corresponding to the predetermined character string via input unit 1. The input unit 1 scans character picture and stroke information of the inputted handwritten character, and sends the character picture and stroke information to the character features extraction section 4. The character features extraction section 4 recognizes whether the inputted handwritten character corresponds to the font character of the basic font storage section 8 based on the character picture and stroke information of the handwritten characters. In this case, since the predetermined character string is already known, already-existing character recognition technology may be enough for recognizing the inputted handwritten characters. Then, the character features extraction section 4 extracts the feature parameters of the handwritten characters by comparing the handwritten characters with corresponding font characters from the basic font storage section 8, and stores the feature parameters in the feature parameter storage section 7.

In this embodiment, "gene" means the features (parameter) which appear to be radicals of the font character, and the appearing degree of the feature is expressed as a numerical value (parameter value). "Chromosome" describes all genes in a predetermined sequence, and "feature parameter" expresses a chromosome as a parameter value.

An example of using the "length of stroke" (parameter/symbol; horizontal stroke/a1, vertical stroke/b1, left pullout stroke/c1, right pullout stroke/d1, dot stroke/e1, flick stroke/f1), the "roundness of stroke" (parameter/symbol; horizontal stroke/a2, vertical stroke/b2, left pullout stroke/c2, right pullout stroke/d2, dot stroke/e2, flick stroke/f2), the "undulation of stroke" (parameter/symbol; horizontal stroke/a3, vertical stroke/b3), the "angle of stroke" (parameter/symbol; left pullout stroke/c3, right pullout stroke/d3, dot stroke/e3, flick stroke/f3), the "weight of stroke" (parameter/symbol; weight/j1, beginning of stroke/j2, middle of stroke/j3, finishing of stroke/j4), the "corner" (parameter/symbol; roundness/g1), and the "deformation of outside shape of font character" (parameter/symbol; upward (downward) stroke to right/h1, leaning stroke to left (right)/i1), as the radicals of a font character is shown in FIG. 3.

When a feature of the font character is expressed, as explained specifically using the Japanese font character "Ei" (meaning "Eternity" in English) of the No. 1 shown in FIG. 6, since "the roundness of a stroke" of the radicals is shaped rounded a little (Each parameter value of the "horizontal stroke (a2)", "vertical stroke (b2)", "left pullout stroke (c2)", "right pullout stroke (d2)", "dot stroke (e2)", "flick stroke (f2)", and "roundness of corner (g1)" is "4"), and other radicals is a standard-value (Each parameter value is "3" as a standard-value, however the standard-value of each parameter of "weight of beginning of stroke (j2)", "weight of middle of stroke (j3)", and "weight of finishing of stroke (j4)" is "1"), the chromosomes of No. 1 enumerates each gene in order of "a1, a2, a3, b1, b2, b3, . . . , j1, j2, j3, j4", and then the feature parameter is described as "3433433433433433434333111" by substituting the parameter of the chromosomes to parameter values. The font characters of Nos. 2–5 are similarly described.

Furthermore, the font characters generated by setting the parameter value of parameters shown in FIG. 3 as five stages of the font character "Ei" of a basic font (skeleton font) are shown in FIGS. 4 and 5. In this case, the example of font generation by setting as "3" all parameter values except the target parameter, and setting as "1" each parameter value of the "weight of beginning of stroke (j2)", "weight of middle of stroke (j3)", and "weight of finishing of stroke (j4)" is shown.

In addition, the range and the step of the parameter value are not limited to this embodiment, but may be fluctuated suitably, and the stage of the parameter value may set to a different stage for every parameter.

In Step S5, the genetic algorithm processing section performs genetic algorithm processing of mutation etc. to the feature parameter of the handwritten character of the user stored in the feature parameter storage section 7, and generates the plural feature parameters.

Upon generating the plural feature parameters, the genetic algorithm processing section 5 generates the plural feature parameters of a new generation by performing processing of crossover and mutation between tow feature parameters selected by the user, and stores the plural generated feature parameters of a new generation in the feature parameter storage section 7.

Here, the "crossover" and the "mutation" processed in the genetic algorithm processing section 5 are explained in detail.

When the chromosome is generated by "crossover" processing, the genetic algorithm processing section 5 splices a gene between two chromosomes by defining the two chromosomes as parents, and performs processing to generate a new chromosome. In addition, although the genetic crossover method includes one-point crossover, two-point crossover, and uniform crossover, it is not necessary to apply these strictly according to genetics in the present invention, and the genetic crossover method can be chosen freely according to the nature of the problem.

More specifically, as shown in FIG. 7B, feature parameters of the Nos. 6, 7, and 8 show examples of chromosomes generated by crossover processing by defining chromosomes of the Nos. 1 and 4 shown in FIG. 7A as parents. The feature parameter of the No. 6 inherits the parameter of the "length of horizontal stroke (a1)", the "roundness of horizontal stroke (a2)", "undulation of horizontal stroke (a3)", "length of vertical stroke (b1)", and "roundness of vertical stroke (b2)", from the parameter (parameter value is "34334") of the No. 1 which is a parent, and inherits other parameters from the parameter (parameter value is "33343343313313335111") of the No. 4. As is evident from this example, the font character No. 6, generated by inheriting a part of the chromosome of the parents by crossover processing, is the inherited features of the horizontal stroke and the vertical stroke from the chromosome of No. 1 which is a parent.

Further, by selecting a favorite font character from the plural font characters as the parents, the gene of the selected parents is inherited by the next generation, and thus there is a high probability that the font characters corresponding to the preferences of the user are generated.

Moreover, when the chromosome is generated by "mutation" processing, the genetic algorithm processing section 5 generates a new chromosome by crossover processing two chromosomes defined as parents, and compulsorily modifies part of the genes the generated new chromosome according to the established rate of probability, in order to modify part of the genes the generated new chromosome independently from the gene of parents. In addition, without restraint from genetic constraints, the mutation probability can be established suitably and the gene to be mutated and the parameter value can be chosen at random.

More specifically, as shown in FIG. 7B, although, feature parameters of the Nos. 9, and 10 are inherited from the parameter values of the Nos. 1 and 4 shown in FIG. 7A as the parents in crossover processing, part of the inherited parameters is a parameter value modified independently from the genes of parents by mutation processing.

For example, in the No. 9, the parameter value "3351" of the "upward (downward) stroke to right (h1)", the "leaning stroke to left (right) (i1)", the "weight (j1)", and the "weight of beginning of stroke (j2)" is modified to the independent parameter value "2515". As a result, a font character with the feature of "right pullout stroke", "leaning stroke to right", "heavy weight of beginning of stroke" and being a thin font character, which is not included in the feature parameters of the parents is generated. In addition, although the example of the mutation occurring to continuous genes is shown in order to make it easier to understand, generally the gene to which the mutation occurs in the chromosome is selected at random.

Thus, a font character having a new feature parameter is generated under a certain probability, and new font characters not yet in existence can be generated.

In addition, the method of generating a preferred font character by visualizing the font character expressed with the feature parameter and allowing the user to adjust the parameter value is also effective. However, since the method of allowing the user to adjust the parameter value is not of an intuitive font generation method type, then it is difficult to adjust the parameter value and generate a preferred font character according to the user's concept. Therefore, By showing plural font characters having a different chromosomes to the user and allowing the user to choose a font character closest to a preferred font character from among them, it becomes possible to create a preferred font intuitively. Then, plural feature parameters having a different parameter values from the feature parameters obtained by processing of step S5 are generated further. Specifically, by the process of "mutation" based on the feature parameter obtained in the processing of Step S5, or by the process of "crossover" between the feature parameter obtained in the processing of Step S5 or Step S3 and the feature parameter with a standard parameter value, a feature parameter with a new parameter value is generated.

Figure 2:
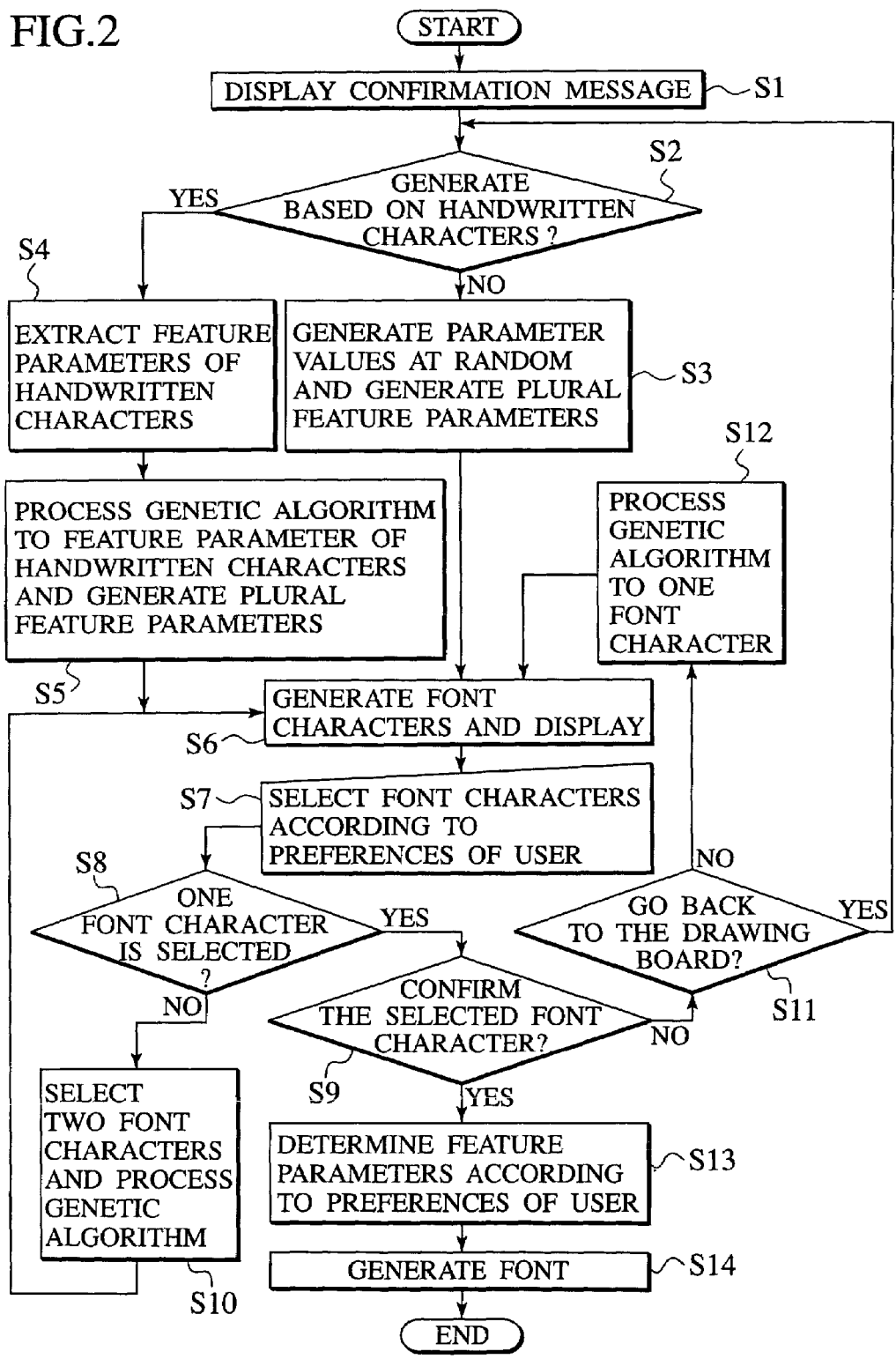
FIG. 2 is a flow chart showing the example of the processing operation of the font generation apparatus shown in FIG. 1.
Figure 8A:
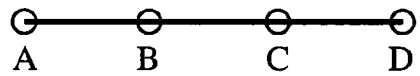
FIGS. 8A to 8E are illustrations for explaining the example of the font generation processing in the present embodiment.
Figure 8B:
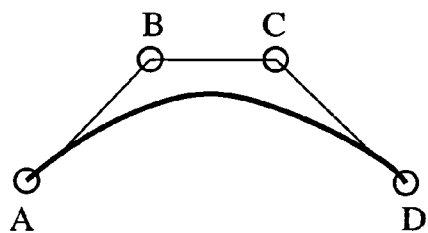
Figure 8C:
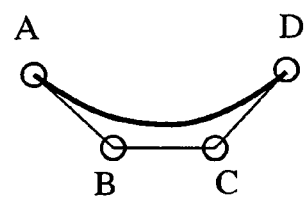
Figure 8D:
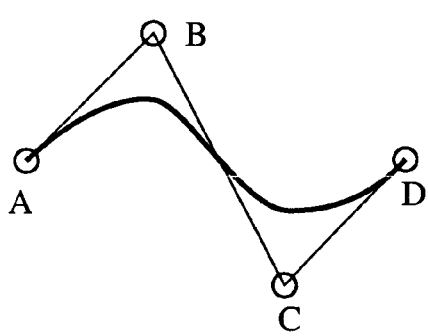
Figure 8E:
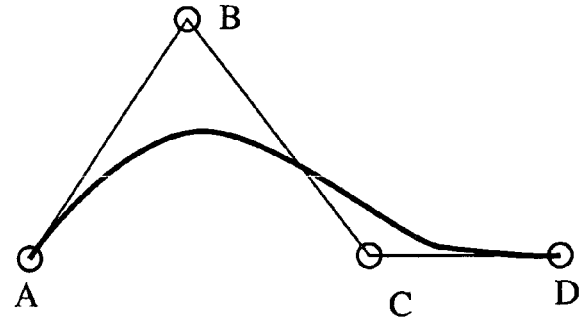

Returning to the flow chart of FIG. 2, in Step S6, the font generation section 6 generates plural font characters based on the plural feature parameters generated in the genetic algorithm processing section 5 and displays the plural generated font characters on the display unit 3. More specifically, the font generation section 6 generates plural font characters by applying the plural feature parameters generated in Step S3 or Step S5 to the radicals of the font character of the basic font stored in the basic font storage section 8, with respect to a character specified by the user or a character established beforehand.

In addition, the number of the font characters displayed on a display unit 3 is adjustable according to a screen size of the display unit 3 or the number of the characters which can be chosen intuitively by the user.

Here, with reference to FIGS. 8A to 8E, a change to the horizontal stroke accompanying a change to the parameter value of the "length of horizontal stroke (a1)", the "roundness of horizontal stroke (a2)", and the "undulation of horizontal stroke (a3)" is explained. In this embodiment, the font generation section 6 expresses the curve constituting a font using "the degree 3 Bezier Curve". The form of the degree 3 Bezier Curve is defined by four control points, then the font generation section 6 can express a curve of various shapes by expressing the coordinates of the four control points with the mathematical formula defining the parameter value as a variable.

In specifically, the X and Y coordinates of the control points A, B, C, and D for expressing the horizontal stroke are expressed as the following formula:

$$A = (0, 0)$$
$$B = (a1 \times k1/3, ((a2-3)+(a3-3)) \times a1 \times k2)$$
$$C = (a1 \times k1 \times 2/3, ((a2-3)-(a3-3)) \times a1 \times k2)$$
$$D = (a1 \times k1, 0) \quad (1)$$

where value of a1, a2, and a3 is any integer from 1 to 5, and k1 and k2 are constants.

The degree 3 Bezier Curve P (t) defined by four control points A B, C, and D is expressed as the following formula $$P(t) = (1-t)^3 A + 3(1-t)^2 tB + 3(1-t)t^2 C + t^3 D \quad (2)$$

where "t" satisfies ($0 \leq t \leq 1$).

As shown in FIGS. 8A to 8E, the shape of the horizontal stroke changes according to modification of the values of parameters a1, a2, and a3. The font generation section 6 generates the font character by arranging the curve generated according to the structure of the font character of the basic font stored in the basic font storage section 8, fleshing out the font character according to the parameter values, such as the "weight", and deformation processing to outside shape of the font character according to parameter values, such as "upward (downward) stroke to right", "leaning stroke to left (right)", or the like. In the present embodiment, although the stroke is expressed using the degree 3 Bezier Curve, the stroke may be expressed not only using the degree 3 Bezier Curve but using other curves.

Returning to the flow chart of FIG. 2, in Step S7, the control section 10 allows the user to select one or more font characters according to the preferences of user from among the font characters displayed on the display unit 3 via the operation unit 2.

In Step S8, the genetic algorithm processing section 5 distinguishes whether or not the font character selected by the user is one character. In Step S8, when one font character is selected, this processing goes to Step S9. On the other hand, when two or more font characters are selected, this processing goes to Step S10.

In Step S9, the genetic algorithm processing section 5 displays a message (confirmation message) which inquires on the display unit 3 as to whether or not confirm the selected preferred font character. If the user selects "Do not confirm", this processing goes to Step S11. On the other hand, if the user selects "Confirm", this processing goes to Step S13.

In Step S11, the genetic algorithm processing section displays a message which inquires on the display unit 3 as to whether or not the generation of the font character should go back to the drawing board, and, via the operation unit 2, allows the user to select whether or not the generation of the font character should go back to the drawing board.

In the processing of Step S11, if the user selects "Go back to the drawing board", this processing returns to Step S2.

On the other hand, in the processing of Step S11, if the user does not select "Go back to the drawing board", this processing goes to Step S12.

In Step S12, the genetic algorithm processing section 5 performs genetic algorithm processing of "mutation" etc. on the feature parameters of the font character selected in Step S7, generates plural next generation feature parameters, and returns this processing to Step S6. Specifically, the genetic algorithm processing section 5 generates the plural feature parameters similarly to the processing of Step S5.

In Step S10, the genetic algorithm processing section 5 selects two font characters from the plural selected font characters, performs the genetic algorithm processing of crossover, mutation, etc. on the feature parameters of the selected font character, generates plural next generation feature parameters, and returns this processing to Step S6. Specifically, when two font characters are selected in the processing of Step S7, the genetic algorithm processing section 5 performs crossover processing and mutation processing to the feature parameter of the two font characters as parents. Moreover, when three or more font characters are selected in the processing of Step S7, the genetic algorithm processing section 5 may select at random two font characters defined as parents, or may allow the user to specify preference weighting at the time of selection and may select two font characters to be defined as parents according to this preference weighting.

In Step S13, if the user selects "Confirm" in Step S9, the genetic algorithm processing section 5 determines the feature parameter of the font character which the user has confirmed as the feature parameter for font creation.

In Step S14, the font generation section 6 creates a font based on the feature parameters according to the preferences of the user and converts the font data to the vector data (TrueType font) as necessary, stores the created font in the generated font storage section 9 corresponding to the character code, and ends the series of font generation processings.

As is clear from above explanation, according to the font generation apparatus of the present embodiment, the genetic algorithm processing section 5 performs genetic algorithm processing on the feature parameters defined as parents, and then the font generation section 6 generates plural new font characters by deforming the font character of the basic font based on the plural new feature parameters generated and displays the plural new font characters generated on the display unit 3. Further, the genetic algorithm processing section 5 determines the feature parameters according to the preferences of the user based on the font character selected by the user from the plural new font characters displayed. And then, the font generation section 6 creates a font based on the feature parameters according to the preferences of the user determined by the genetic algorithm processing section 5. That is, a font character that corresponds more and more to the preferences of the user can be generated by repeating heredity and selection. Therefore, the user need only repeat the selection a preferred font character from among the plural displayed font characters, to create a font according to the user's own preferences. Thus, the user can create the font intuitively, without effort, and without concern for details, such as the structure of the font character. Furthermore, a font inheriting the features of the user own handwritten characters can be easily created by seasoning with the features of the user's handwritten characters as parameter values (gene).

Although the embodiments of the present invention have been described in detail, the present invention may be embodied in other specific forms without departing from the spirit or essential characteristics thereof.

For example, when a font character corresponding to the user's preferences is not generated, the development of the font may be influenced by changing the mutation probability, or by multiplying the font group of the present generation as new gene information, as once created, storing and reading of the gene information of the font becomes possible.

Thus, the present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

This application claims benefit of priority under 35 USC §119 to Japanese Patent Application No. 2002-279612 filed on Sep. 25, 2002, the entire contents of which are incorporated by reference herein.

What is claimed is:

1. An apparatus for font generation comprising:
a basic font storage section storing a font character of a basic font for generating a font character;
a feature parameter storage section storing a feature parameter representing a feature of the font character, the feature parameter including at least one of the features of radicals of the font character based on the character's stroke resulting in a shape of the font character;
a genetic algorithm processing section configured to generate plural new feature parameters by performing genetic algorithm processing on the feature parameter;
a font generation section configured to generate new font characters by deforming the font character of the basic font based on the plural new feature parameters generated in the genetic algorithm processing section;
a display unit displaying the new font characters generated in the font generation section;
a first input unit scanning a character handwritten by the user;
a second input unit to receive a font selected by the user from among font characters displayed on a display unit; and
a character features extraction section configured to recognize a character from character data scanned by the first input unit, to compare the recognized character and the font character of the basic font, and to extract a feature of the handwritten character as the feature parameter wherein
the genetic algorithm processing section determines the plural new feature parameters according to the preferences of a user based on a font character selected by the user from among the font characters displayed on the display unit, and
the font generation section creates a font based on the plural new feature parameters according to the preferences of the user determined by the genetic algorithm processing section.

2. The apparatus of claim 1, wherein the genetic algorithm processing section generates plural new feature parameters by performing genetic algorithm processing including crossover and mutation on two feature parameters selected from the feature parameter.

3. An apparatus for font generation comprising:
a basic font storage section storing a font character of a basic font for generating a font character;
a feature parameter storage section storing a feature parameter representing a feature of the font character;
a genetic algorithm processing section configured to generate plural new feature parameters by performing genetic algorithm processing on the feature parameter;
an input unit to receive a font selected by the user from among font characters displayed on a display unit;
a font generation section configured to generate new font characters by deforming the font character of the basic font based on the plural new feature parameters generated in the genetic algorithm processing section; and
a display unit displaying the new font characters generated in the font generation section;
wherein the genetic algorithm processing section determines the plural new feature parameters according to the preferences of a user based on a font character selected by the user from among the font characters displayed on the display unit,
the font generation section creates a font based on the plural new feature parameters according to the preferences of the user determined by the genetic algorithm processing section,
the feature parameter including at least one of the features of radicals of the font character of the length of stroke, the roundness of stroke, the undulation of stroke, the angle of stroke, the weight of stroke, the corner, and the deformation of outside shape of font character.

4. An apparatus for font generation comprising: a basic font storage section storing a font character of a basic font for generating a font character;
a feature parameter storage section storing a feature parameter expressing a numerical value of the font character;
a genetic algorithm processing section configured to generate plural new feature parameters by performing genetic algorithm processing on the feature parameter;
a font generation section configured to generate new font characters by deforming the font character of the basic font based on the plural feature parameters, generated in the genetic algorithm processing section; and
a display unit displaying the new font characters generated in the font generation section; wherein
the genetic algorithm processing section determines the feature parameter according to the preferences of a user based on a font character selected by the user from among the new font characters displayed on the display unit, the font generation section creates a font based on the feature parameter according to the preferences of the user determined by the genetic algorithm processing section, an input unit scanning a character handwritten by the user; and a character features extraction section configured to recognize a character from character data scanned by the input unit, to compare the recognized character and the font character of the basic font, and to extract a feature of the handwritten character as the feature parameter, wherein the feature parameter includes at least one of the features of radicals of the font character of the length of stroke, the roundness of stroke, the undulation of stroke, the angle of stroke, the weight of stroke, the corner, and the deformation of outside shape of font character.

5. A computer readable storage medium recording a program for font generation, the program executing in a font generation apparatus, the program comprising:

generating plural new feature parameters by performing genetic algorithm processing on a parent feature parameter representing the feature of a font character;

generating new font characters by deforming a font character of a basic font for generating a font character based on the plural new feature parameters;

displaying the new font characters on a display unit;

determining a new parent feature parameter according to the preferences of a user based on a font character selected by the user from among the new font characters displayed on the display unit;

creating a font based on the new parent feature parameter according to the preferences of the user, scanning a character handwritten by the user with an input unit; and recognizing a character from character data scanned by the input unit;

comparing the recognized character and the font character of the basic font, and extracting a feature of the handwritten character as the feature parameter, wherein the feature parameter including at least one of the features of radicals of the font character based on the character's stroke resulting in a shape of the font character.

6. The computer readable storage medium of claim 5, wherein the genetic algorithm processing includes generating plural new feature parameters by performing genetic algorithm processing including crossover and mutation on two feature parameters selected from the feature parameter.

7. A computer readable storage medium recording a program for font generation, the program executing in a font generation apparatus, the program comprising:

generating plural new feature parameters by performing genetic algorithm processing on a parent feature parameter representing a feature of a font character;

generating new font characters by deforming a font character of a basic font for generating a font character based on the plural new feature parameters;

displaying the new font characters on a display unit;

determining a new parent feature parameter according to the preferences of a user based on a font character selected by the user from among the new font characters displayed on the display unit; and creating a font based on the new parent feature parameter according to the preferences of the users, the parent feature parameter including at least one of the features of radicals of the font character of the length of stroke, the roundness of stroke, the undulation of stroke, the angle of stroke, the weight of stroke, the corner, and the deformation of outside shape of font character.

8. A computer readable storage medium recording a program for font generation, the program executing in a font generation apparatus, the program comprising:

generating plural new feature parameters by performing genetic algorithm processing on a feature parameter expressing the feature of a font character; generating new font characters by deforming a font character of a basic font for generating a font character based on the plural generated feature parameters; displaying the new generated font characters on a display unit;

determining the feature parameter according to the preferences of a user based on a font character selected by the user from among the new font characters displayed on the display unit; and creating a font based on the determined feature parameter according to the preferences of the user; and scanning a character handwritten by the user with an input unit; and recognizing a character from character data scanned by the input unit; comparing the recognized character and the font character of the basic font, and extracting a feature of the handwritten character as a feature parameters, the feature parameter including at least one of the features of radicals of the font character of the length of stroke, the roundness of stroke, the undulation of stroke, the angle of stroke, the weight of stroke, the corner, and the deformation of outside shape of font character.

9. A method for font generation in an apparatus for font generation, the method comprising:

generating plural new feature parameters by performing genetic algorithm processing on a parent feature parameter representing a feature of a font character;

generating new font characters by deforming a font character of a basic font for generating a font character based on the plural new feature parameters;

displaying the new font characters on a display unit;

determining a new parent feature parameter according to the preferences of a user based on a font character selected by the user from among the new font characters displayed on the display unit;

creating a font based on the new parent feature parameter according to the preferences of the user;

scanning a character handwritten by the user with an input unit;

recognizing a character from character data scanned by the input unit; and comparing the recognized character and the font character of the basic font, and extracting a feature of the handwritten character as the feature parameter, wherein the feature parameter including at least one of the features of radicals of the font character based on the character's stroke resulting in a shape of the font character.

10. The method of claim 9, wherein the genetic algorithm processing includes generating plural new feature parameters by performing genetic algorithm processing including crossover and mutation on two of the feature parameters selected from the feature parameter.

11. A method for font generation in an apparatus for font generation, the method comprising:

generating plural new feature parameters by performing genetic algorithm processing on a parent feature parameter representing a feature of a font character;

generating new font characters by deforming a font character of a basic font for generating a font character based on the plural new feature parameters;
displaying the new font characters on a display unit;
determining a new parent feature parameter according to the preferences of a user based on a font character selected by the user from among the new font characters displayed on the display unit; and
creating a font based on the new parent feature parameter according to the preferences of the user,
the parent feature parameter including at least one of the features of radicals of the font character of the length of stroke, the roundness of stroke, the undulation of stroke, the angle of stroke, the weight of stroke, the corner, and the deformation of outside shape of font character.

12. A method for font generation in an apparatus for font generation, the method comprising:
generating plural new feature parameters by performing genetic algorithm processing on a feature parameter expressing the feature of a font character; generating new font characters by deforming a font character of a basic font for generating a font character based on the plural generated feature parameters;
displaying the new generated font characters on a display unit; determining the feature parameter according to the preferences of a user based on a font character selected by the user from among the new font characters displayed on the display unit;
creating a font based on the determined feature parameter according to the preferences of the user; and
scanning a character handwritten by the user with an input unit; and recognizing a character from character data scanned by the input unit; comparing the recognized character and the font character of the basic font, and extracting a feature of the handwritten character as a feature parameter,
the feature parameter including at least one of the features of radicals of the font character of the length of stroke, the roundness of stroke, the undulation of stroke, the angle of stroke, the weight of stroke, the corner, and the deformation of outside shape of font character.

* * * * *

UNITED STATES PATENT AND TRADEMARK OFFICE
CERTIFICATE OF CORRECTION

PATENT NO.  : 7,009,612 B2
DATED       : March 7, 2006
INVENTOR(S) : Hakamada

It is certified that error appears in the above-identified patent and that said Letters Patent is hereby corrected as shown below:

Column 12,
Line 59, delete "parameters, generated" and replace with -- parameters generated --.

Column 14,
Line 26, delete "feature parameters" and replace with -- feature parameter --.

Signed and Sealed this

Second Day of May, 2006

JON W. DUDAS
*Director of the United States Patent and Trademark Office*